(12) United States Patent
Scipio et al.

(10) Patent No.: US 10,544,739 B2
(45) Date of Patent: Jan. 28, 2020

(54) METHOD AND APPARATUS FOR OPTIMIZING THE OPERATION OF A TURBINE SYSTEM UNDER FLEXIBLE LOADS

(71) Applicant: General Electric Company, Schenectady, NY (US)

(72) Inventors: Alston Ilford Scipio, Mableton, GA (US); Michael Anthony Cocca, Atlanta, GA (US); Thomas John Freeman, Canton, GA (US); Michael Wesley Yarnold, Decatur, GA (US); Ryan Eric Obenhoff, Marietta, GA (US); Sanji Ekanayake, Mableton, GA (US); Douglas Corbin Warwick, Roswell, GA (US); Joseph Philip Klosinski, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 951 days.

(21) Appl. No.: 15/049,674

(22) Filed: Feb. 22, 2016

(65) Prior Publication Data

US 2017/0191426 A1 Jul. 6, 2017

Related U.S. Application Data

(62) Division of application No. 13/303,852, filed on Nov. 23, 2011, now Pat. No. 9,297,316.

(51) Int. Cl.
*F02C 6/08* (2006.01)
*F02C 9/18* (2006.01)
(Continued)

(52) U.S. Cl.
CPC ............... *F02C 9/18* (2013.01); *F01K 23/10* (2013.01); *F02C 3/13* (2013.01); *F02C 3/34* (2013.01);
(Continued)

(58) Field of Classification Search
CPC ...... F02C 6/08; F02C 3/34; F02C 1/08; F02C 1/005
See application file for complete search history.

(56) References Cited

U.S. PATENT DOCUMENTS 4,380,893 A * 4/1983 Stokes ................... F02C 9/18
415/27
5,417,053 A * 5/1995 Uji ........................ F01K 21/042
60/39.58

(Continued)

FOREIGN PATENT DOCUMENTS

EP    1 063 402 A2    12/2000
EP    1 816 327 A2    8/2007
(Continued)

OTHER PUBLICATIONS

Decision to Grant issued in connection with corresponding RU Application No. 2012149579 dated Nov. 1, 2016.
(Continued)

*Primary Examiner* — Gerald L Sung
(74) *Attorney, Agent, or Firm* — Eversheds Sutherland (US) LLP

(57) ABSTRACT

A gas turbine system includes a compressor protection subsystem; a hibernation mode subsystem; and a control subsystem that controls the compressor subsystem and the hibernation subsystem. At partial loads on the turbine system, the compressor protection subsystem maintains an air flow through a compressor at an airflow coefficient for the partial load above a minimum flow rate coefficient where (Continued)

aeromechanical stresses occur in the compressor. The air fuel ratio in a combustor is maintained where exhaust gas emission components from the turbine are maintained below a predetermined component emission level while operating at partial loads.

10 Claims, 11 Drawing Sheets

(51) Int. Cl.
    *F02C 3/34*     (2006.01)
    *F02C 9/22*     (2006.01)
    *F02C 9/26*     (2006.01)
    *F01K 23/10*     (2006.01)
    *F02C 3/13*     (2006.01)
    *F02C 9/28*     (2006.01)
    *F23R 3/26*     (2006.01)

(52) U.S. Cl.
    CPC ............ *F02C 9/22* (2013.01); *F02C 9/26* (2013.01); *F02C 9/28* (2013.01); *F23R 3/26* (2013.01); *Y02E 20/14* (2013.01); *Y02E 20/16* (2013.01); *Y02E 20/18* (2013.01)

(56) References Cited

U.S. PATENT DOCUMENTS

| | | | |
|---|---|---|---|
| 6,173,562 | B1 | 1/2001 | Utamura et al. |
| 6,202,400 | B1 | 3/2001 | Utamura et al. |
| 7,861,511 | B2 | 1/2011 | Chillar et al. |
| 8,267,639 | B2 | 9/2012 | Henahan |
| 8,844,258 | B2 | 9/2014 | Ekanayake et al. |
| 2002/0066275 | A1 | 6/2002 | Jungsch et al. |
| 2004/0045300 | A1 | 3/2004 | Dovali-Solis |
| 2007/0034171 | A1* | 2/2007 | Griffin ............. F01K 21/047 122/479.1 |
| 2008/0053921 | A1 | 3/2008 | Visser |
| 2009/0107141 | A1* | 4/2009 | Chillar ............. F02C 1/08 60/605.2 |
| 2009/0145126 | A1 | 6/2009 | Chillar et al. |
| 2009/0205310 | A1* | 8/2009 | Hibshman, II ........ F01K 23/101 60/39.182 |
| 2010/0175385 | A1 | 7/2010 | Plant et al. |
| 2010/0272588 | A1* | 10/2010 | Scotti Del Greco ... F02C 1/005 417/408 |
| 2011/0000220 | A1* | 1/2011 | Hibshman, II ........ F01K 23/101 60/783 |
| 2011/0056181 | A1 | 3/2011 | Dinu |
| 2012/0240590 | A1* | 9/2012 | Hellat ............... F01D 25/08 60/772 |
| 2012/0260668 | A1 | 10/2012 | Rogers et al. |
| 2013/0174535 | A1* | 7/2013 | Van Straaten ........ F02C 3/34 60/269 |
| 2014/0000270 | A1* | 1/2014 | Dobbeling ............. F02C 3/04 60/772 |
| 2014/0305127 | A1* | 10/2014 | Schroder ............. F02C 6/16 60/772 |
| 2018/0058337 | A1* | 3/2018 | Alexander ............. F02C 9/50 |

FOREIGN PATENT DOCUMENTS

| | | |
|---|---|---|
| JP | H6-101500 A | 4/1994 |
| JP | H7-012090 A | 1/1995 |
| JP | H11-072027 A | 3/1999 |
| JP | H11-072029 A | 3/1999 |
| JP | 2008-064117 A | 3/2008 |
| JP | 2008-75578 A | 4/2008 |
| JP | 2009-52548 A | 3/2009 |
| JP | 2009-197797 A | 9/2009 |
| RU | 2 312 229 C2 | 12/2007 |
| RU | 2007 134 749 A | 3/2009 |

OTHER PUBLICATIONS

Machine Translation and a Notification of Reasons for Refusal issued in connection with corresponding JP Application No. 2012-248899 dated Dec. 20, 2016.

Extended European Search Report and Opinion issued in connection with corresponding EP Application No. 12193660.3 dated May 16, 2017.

Machine Translation and a Decision to Grant issued in connection with corresponding JP Application No. 2012-248899 dated Aug. 15, 2017.

* cited by examiner

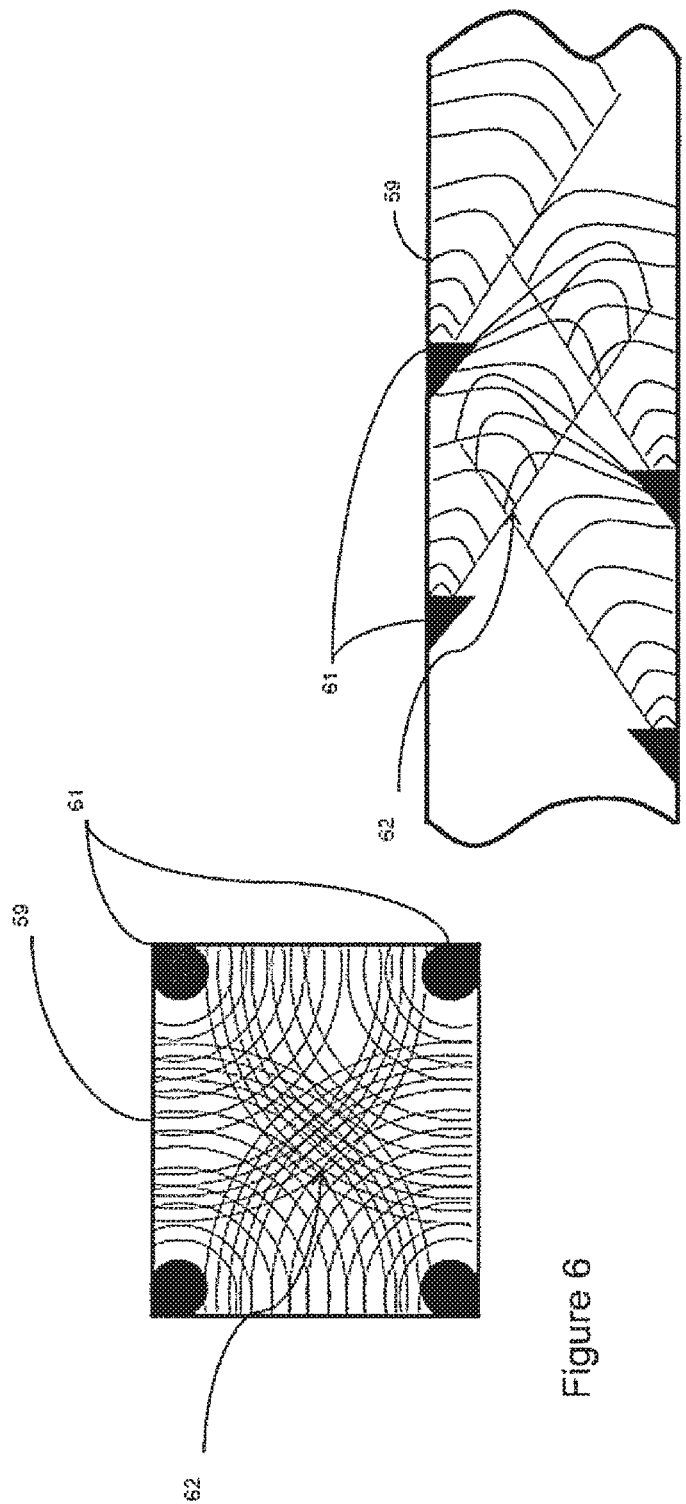

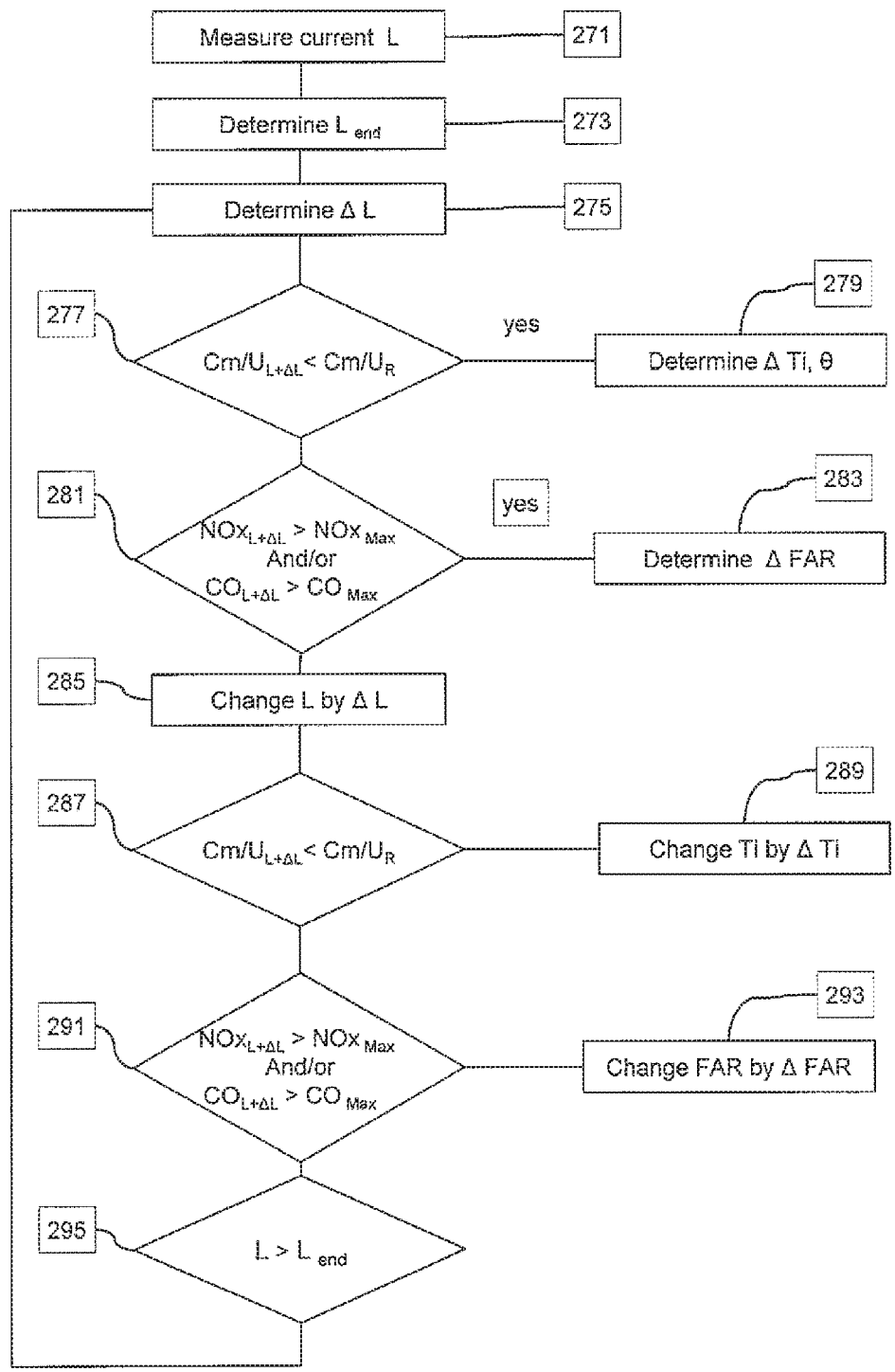

METHOD AND APPARATUS FOR OPTIMIZING THE OPERATION OF A TURBINE SYSTEM UNDER FLEXIBLE LOADS

CROSS-REFERENCE TO RELATED APPLICATIONS

This application is a divisional and claims priority to U.S. patent application Ser. No. 13/303,852, filed Nov. 23, 2011 for "METHOD AND APPARATUS FOR OPTIMIZING THE OPERATION OF A TURBINE SYSTEM UNDER FLEXIBLE LOADS", which is hereby incorporated by reference in its entirety and is assigned to the assignee of the present invention.

TECHNICAL FIELD

The present invention relates to gas turbine systems, and more particularly to apparatus and methods for optimizing the operation of a turbine system under flexible loads.

BACKGROUND

As a result of continuing global population and income growth, electricity demand continues to increase worldwide. Electricity grids are required to adjust to large somewhat unpredictable swings in demand as well as the planned and unplanned changes in production capacity. Additionally, alternative sources such as wind and solar generated power are growing in importance and these sources have an impact in the way that power is generated to meet the demand.

Electricity demand is chaotic. Demand may vary on a daily, monthly, seasonal and yearly cycles. For example, a typical residential daily demand profile on a hot day may show a minimum in the early morning hours, and a maximum in the early evening hours. Commercial demand on the same day may show a minimum in the early evening hours and a maximum around the middle of the day. Weather and season of the year also impact demand. The peak demand may in some cases be double the minimum demand.

Because electricity generated by power companies cannot be efficiently stored, electric utilities have traditionally generated power with a combination of different approaches to production. For example, large nuclear or coal fired plants may be used for generating a minimum amount of power (baseload). Baseload power plants typically operate continuously at maximum output.

During times of peak demand (peak load) power companies may use simple cycle gas turbines for generating power. Gas turbines are desirable for supplying the additional capacity required during peak loads because of their ability to start up quickly, producing electrical power in 10 to 30 minutes. Gas turbines used to generate power during periods of peak loads may be shut down for portions of a day when the demand for power is low. The period of operation of the gas turbines may vary in accordance with the demand.

Some utilities also operate load following plants that run during the day to supply power during periods of intermediate demand. Combined cycle gas turbine systems are sometimes used for as load following plants. COMBINED CYCLE GAS TURBINE systems typically include a heat recovery steam generator coupled to the exhaust of the gas turbine. combined cycle gas turbine systems may adjust their power output as demand fluctuates throughout the day. combined cycle gas turbine systems are typically in between base load power plants and peaking plants (e.g. gas turbines used to provide peak power) in efficiency, speed of startup and shutdown, and capacity.

To meet the increased demands and address environmental concerns, many utilities are using sources of renewable energy, such as wind and solar power to meet intermediate and peaking loads. These sources add additional variability to the electricity demand because of their intermittent generation capacity. For example, power output of a solar electricity generation plant varies depending on the cloud cover and, similarly wind power output will vary depending on wind speed.

Gas turbines have a number of advantages as sources of power for peak loads. Gas turbines are efficient, have a relatively low installed cost, have a relatively fast start up, and shut down and low emissions. The startup sequence of a gas turbine begins with energizing a starter. When the RPM of the turbine reaches a light up RPM the ignition systems are energized and fuel is provided to the combustor. Upon combustion, the fuel flow is increased while maintaining temperatures below established temperature limits. Fuel flow is then controlled to achieve smooth acceleration until idle speed is reached.

A gas turbine may be operated at base load, peak load, and loads below the base load. The gas turbine baseload is the load that optimizes power output, and hot gas path parts life. ANSI B133.6 Ratings and Performance defines base load as operation at 8,000 hours per year with 800 hours per start. It also defines peak load as operation at 1250 hours per year with five hours per start. The peak load of a gas turbine is a load that maximizes power output, frequently at the expense of efficiency, parts life and inspection intervals. Gas turbines may be operated at partial or low loads in order to be able to quickly ramp up to higher output when demand for power increases. There are advantages and disadvantages in operating a gas turbine at partial loads. One advantage is to reduce the plant maintenance costs incurred during start-ups and shut-downs. However, operation at low loads results in lower operating efficiencies and higher operating costs.

Work from a gas turbine varies as a function of mass flow, heat energy in the combusted gas, and temperature differential across the turbine. These factors may be affected by ambient conditions, fuels, inlet and exhaust losses, fuel heating, diluent injection, air extraction, inlet cooling and steam and water injection. For example, changes in ambient conditions (pressure, temperature and humidity) affect the density and/or mass flow of the air intake to the compressor and consequently gas turbine performance. The mass flow is in turn a function of compressor airflow and fuel flow.

Compliance with emission standards is also a major constraint in the operation of gas turbines. Most gas turbines combust low sulfur and low ash fuels. Consequently, the major pollutants emitted from gas turbines are nitrogen oxides (NO and NO2, collectively referred to as NOx), carbon monoxide (CO), and volatile organic compounds (VOC). NOx and CO are considered the primary emissions of significance when combusting natural gas in gas turbines. Emissions from gas turbines vary significantly as a function of ambient temperature, load, and pollutant concentration. Below 50% load, emission concentrations may increase. This is especially true for carbon monoxide (CO). Consequently, there is a limit to the load level at which conventional gas turbine systems may be operated while still complying with emission standards.

Emission standards applicable to gas turbine operations may vary by country and in the United States, in addition to Federal standards, standards may vary from State to State.

Regulatory authorities may impose various regimes for regulating emissions. For example, an NOx emission limit may be stated as pounds of NOx per unit of output, or per unit of heat input (instantaneous limit). In some cases the standards may be formulated as a concentration-based or an output-based emission standard. A concentration-based limit may be stated in units of parts per million by volume (ppmv). The output-based emission limit may be stated in units of emissions mass per unit useful recovered energy, or pounds per megawatt-hour. Some plants may be limited on the basis of the number of tons of NOx emitted per year or other time period (periodic limit).

Some power plants have emissions limits and other restrictions when in the startup mode. Types of startup limits include: (a) pounds per hour, (b) lb/event/CTG and (c) lb/event/power block. A maximum allowable lb/hour limit may be required by the regulatory agency, since it is the most straightforward value to use in an air quality impact assessment.

One of the problems with the operation of gas turbines over wide power ranges is that efficiency, fuel consumption and emissions, specifically, NOx and CO emissions, may be negatively affected. For example, when a plant operator operates a conventional gas turbine at low loads there is a significant decrease in efficiency. Another problem is that the compressor may be subjected to aeromechanical stresses in the aft stages when the gas-fired turbine is operated at lower loads in low ambient temperature conditions. These stresses occur below the aerodynamic stability limit due to an excitation of an aeromechanical mode which is driven by an increase in the stage loading parameter. The flow rate coefficient values at which these stresses are evident are referred to as the turndown restricted zone. Yet another problem with gas turbines operating at lower ambient temperatures is that the minimum load required for CO compliance is a function of, among other things, the ambient temperature. For example, in some gas turbines, as the temperature falls below 35 F (1.7 C), the minimum load for CO compliance rises steeply. Yet another problem is that the use of a heat recovery steam generator in a combined cycle gas turbine systems may impose additional constraints on the optimal gas turbine operation at base-load, part-load and load-ramp operating modes. Yet another problem is that when the gas turbine is operated at extreme low hibernation modes of approximately 10% load there is the potential of combustor lean blowout (i.e. loss of flame).

BRIEF DESCRIPTION OF THE INVENTION

According to one aspect of the invention, a method for changing the power output in a gas turbine system is provided. The method of this aspect includes determining an existing power output and a desired power output. The method also includes measuring existing compressor parameters and combustor parameters; calculating a compressor flow rate coefficient for the desired power output; and calculating an emission rate for the desired power output. If the flow rate coefficient for the desired power output is less than a predetermined turndown limit, then method includes calculating new compressor parameters that result in a flow rate coefficient above the predetermined turndown limit. If the calculated emission rate is greater than a predetermined emissions limit, then the method includes calculating new combustor parameters that result in an emission rate lower than the predetermined emissions limit. The method also includes changing the power output to the desired power output; changing the compressor parameters to the new compressor parameters; and changing the combustor parameters to the new combustor parameters.

According to another aspect of the present invention, a gas turbine system is provided. The gas turbine system of this aspect includes a compressor; a combustor; a turbine; a compressor protection subsystem; a hibernation mode subsystem; and a control subsystem that controls the compressor subsystem and the hibernation subsystem.

According to another aspect of the present invention a method of extending the turndown range of the gas turbine system is provided. The method includes establishing minimum air flow parameters for air flowing through the compressor; conveying turbine exhaust from the turbine to a mixing assembly at a first flow rate; conveying compressed air from the compressor to the mixing assembly at a second flow rate; and controlling the first flow rate and the second flow rate to maintain the compressor airflow above the minimum air flow parameters.

According to another aspect of the present invention a method of improving the efficiency of the combined cycle gas turbine at partial load is provided. The method includes maintaining an air flow through a compressor at an airflow coefficient for the partial load above a minimum flow rate coefficient where aeromechanical stresses occur in the compressor; maintaining an air fuel ratio in a combustor where exhaust gas emission components from the turbine are maintained below a predetermined component emission level; and maintaining an exhaust gas temperature at an inlet of a heat recirculation steam generator below a predetermined maximum inlet temperature.

According to another aspect of the present invention, a system for improving the efficiency of a combined cycle gas turbine at partial load. The system includes a turndown subsystem; a hibernation subsystem; a combined cycle isotherm subsystem; and a control subsystem that provides instructions to the turndown subsystem to maintain in airflow through a compressor an inner flow coefficient for the partial load up of a minimum flow rate coefficient where aeromechanical stresses occur in the compressor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a cross sectional view of a fogger component of the combined cycle isotherm subsystem according to one embodiment of the present invention.

FIG. 7 is a longitudinal sectional view of a fogger component of the combined cycle isotherm subsystem according to one embodiment of the present invention.

FIG. 12 is a flow diagram of a method for extending the turndown range of a gas turbine system according to one embodiment of the present invention.

DETAILED DESCRIPTION OF THE INVENTION

Figure 1:
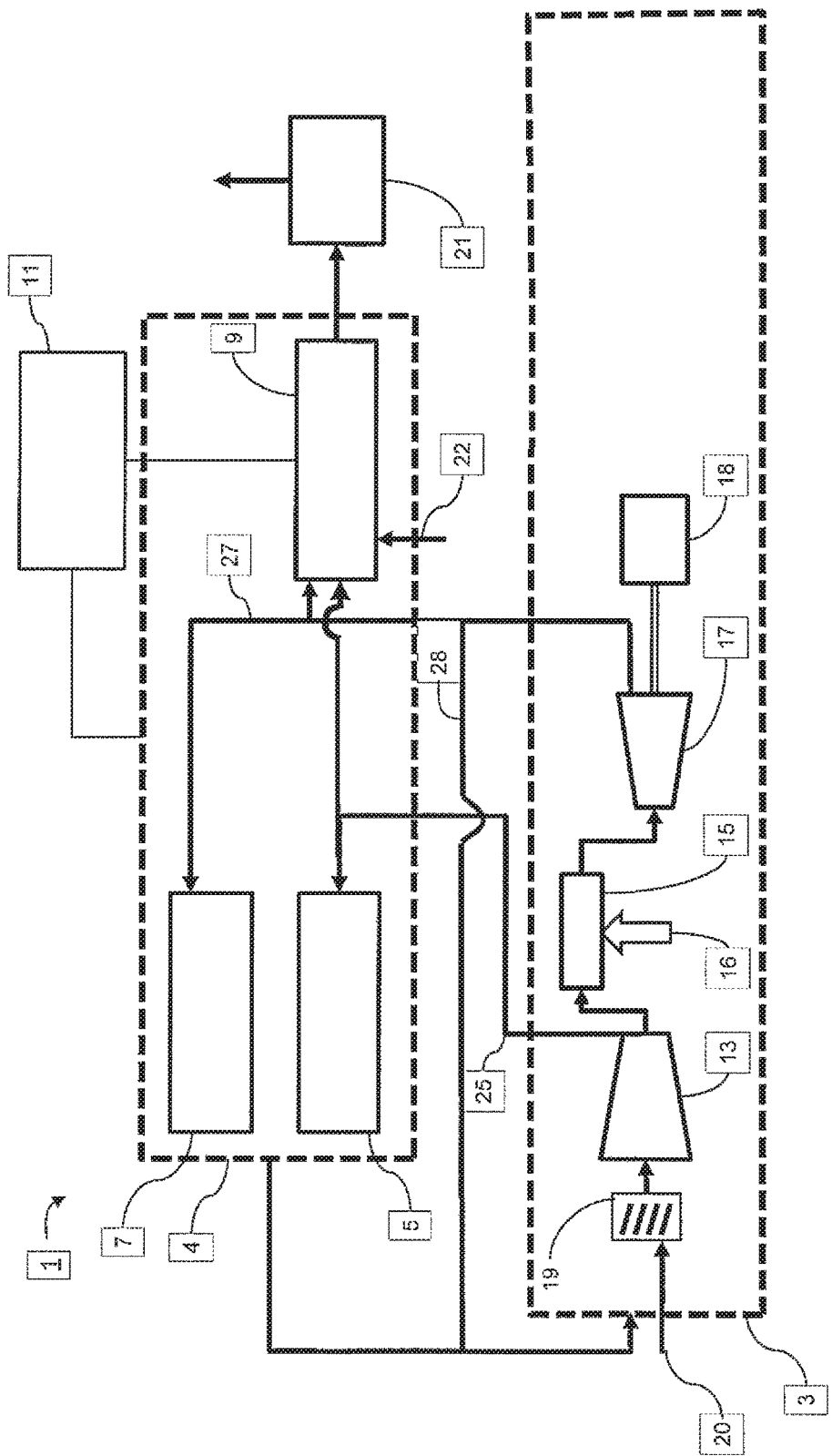
FIG. 1 is a block diagram of an embodiment of a gas turbine system according to one embodiment of the present invention.

FIG. 1 illustrates a high-level schematic of an embodiment of a gas turbine system 1. The gas turbine system 1 includes a conventional gas turbine 3, turndown subsystem 4, and a control subsystem 11. The turndown subsystem 4 may include a compressor protection subsystem 5, a hibernation mode subsystem 7 and a combined cycle isotherm subsystem 9.

The gas turbine 3 may include a compressor 13, a combustor 15, a turbine 17, a generator 18, an inlet guide vane (IGV) subsystem 19 and a heat recovery steam generator (heat recovery steam generator subsystem 21) subsystem 21. In operation, ambient air 20 is drawn through the IGV subsystem 19 and enters the compressor 13. The temperature, pressure and relative humidity of ambient air 20 will obviously vary. For comparative purposes, the turbine industry has established standard conditions for ambient air. The standard conditions are 59° F./15° C., 14.696 psia/1.013 bar and 60% relative humidity. The IGV subsystem 19 serves to vary the volumetric flow into the compressor 13. Compressed air from the compressor 13 enters the combustor 15 where it is mixed with fuel from fuel input 16 and combusted. Exhaust air from the combustor 15 drives the turbine 17 which in turns drives a shaft connected to the generator 18. In some systems the exhaust gases are made to flow into an heat recovery steam generator subsystem 21 which recovers heat from the exhaust gases and drives a steam turbine (not shown) to generate additional power and/or provide steam to a process such as district heating. The gas turbine system 1 also includes a compressor bleed line 25 and an exhaust gas extraction line 27 coupling the gas turbine 3 to the turndown subsystem 4. In another embodiment, an exhaust gas extraction line 28 may be provided to bypass turndown subsystem 4, and provide exhaust gasses directly to gas turbine 3. Compressor bleed line 25 and exhaust gas extraction line 27 may also be coupled to the combined cycle isotherm subsystem 9 where the gasses may be blended with attemperation fluids at combined cycle input 22. The attemperation fluid may be ambient air, water, steam, any combination thereof, or any other fluid that can provide the function of regulating the temperature of gasses in the combined cycle isotherm subsystem 9.

Figure 2:
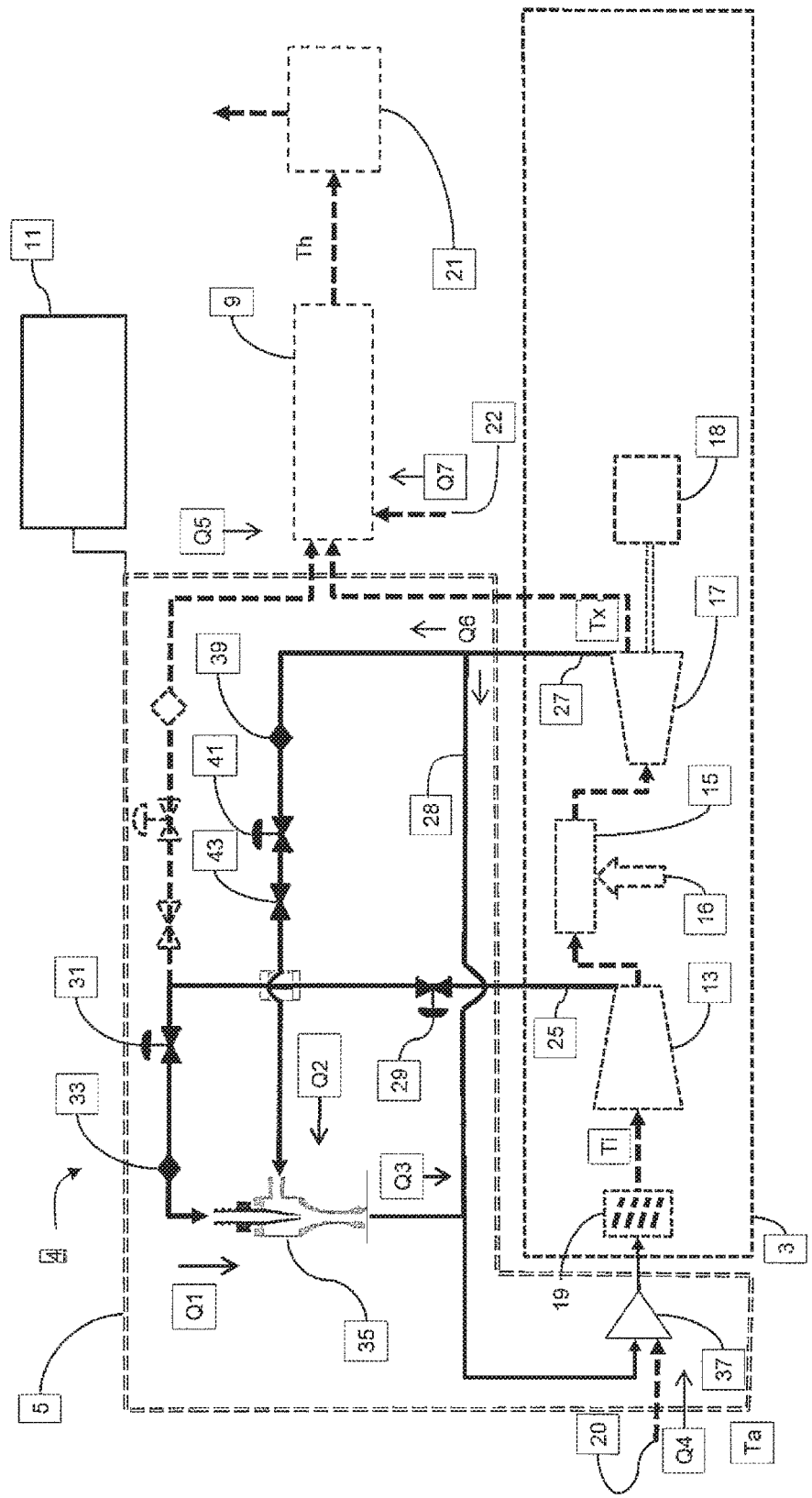
FIG. 2 is a block diagram illustrating a turndown subsystem according to one embodiment of the present invention.

Illustrated in FIG. 2 is one embodiment of the compressor protection subsystem 5 (outlined in a double dashed line). The components that represent the compressor protection subsystem 5 are illustrated in solid lines. Other components of the gas turbine system 1 are illustrated as dashed lines. In this embodiment, the compressor bleed line 25 is coupled to an external duct assembly including an upstream compressor bleed control valve 29, a downstream compressor bleed control valve 31, and a compressor bleed flow sensor 33. Control subsystem 11 controls the control valve 31 which in turn controls the flow rate of the compressed air (Q1). Compressed air is transported to a blending assembly 35, such as a manifold or eductor where it is blended with exhaust gas and conveyed to the IGV subsystem 19. The exhaust air is provided by an external duct assembly coupled to the exhaust gas extraction line 27. The exhaust gas extraction line 27 is provided with an exhaust gas extraction (EGE) flow sensor 39, an EGE control valve 41 and an EGE block valve 43. The EGE sensor 39 provides data of the flow rate of exhaust gasses (Q2) to the control subsystem 11. The control subsystem 11 provides control signals to the upstream compressor bleed control valve 29, the downstream compressor bleed control valve 31, the EGE flow sensor 39 the EGE control valve 41 and the EGE block valve 43. The A compressor and exhaust may be blended with ambient air at gas turbine inlet system 37.

Figure 3:
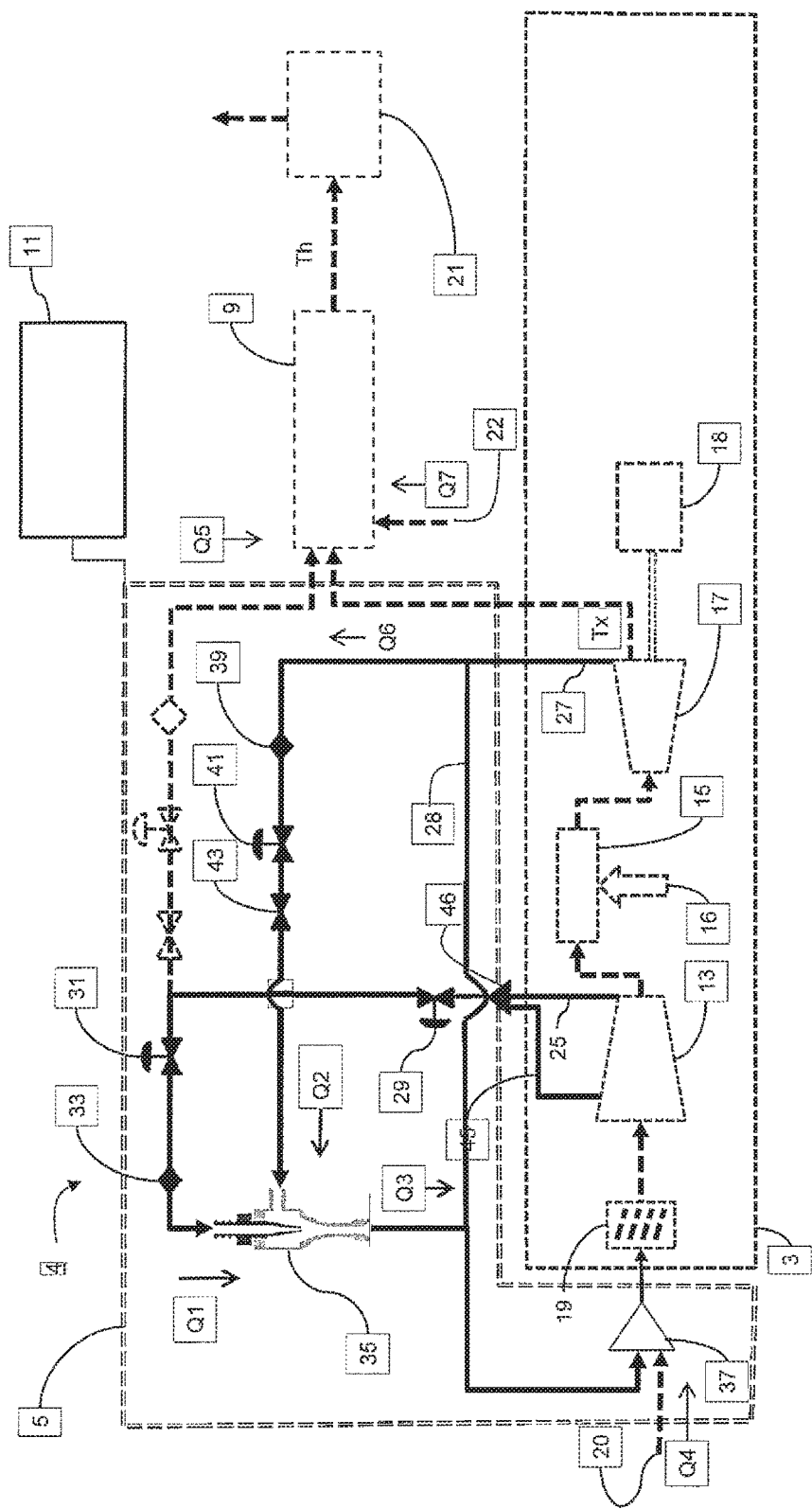
FIG. 3 is a block diagram illustrating a turndown subsystem according to an alternate embodiment of the present invention.

Illustrated in FIG. 3 is an alternate embodiment of a compressor protection subsystem 5 where an intermediate stage compressor bleed line 45 is connected to an intermediate stage of the compressor 13. Compressed air from the compressor bleed line 25 and the intermediate stage compressor bleed line 45 is mixed through a blending component 46 such as a manifold or eductor to create a first blend. The blended compressor air is blended with exhaust air from exhaust gas extraction line 27 at blending assembly 35. The second blend may then be blended with the ambient air 20 at the gas turbine inlet system 37 and the blended gasses are supplied through the IGV 19 to the compressor 13.

The compressor protection subsystem 5 provides the operator of the gas turbine 3 with the ability to control the performance of the system through continuous control of compressor parameters, such as the stage loading parameters and the flow coefficient of the air passing through the compressor. The stage loading parameter is a non-dimensional measure of the work extraction per stage, a high stage loading is desirable because it means fewer stages are needed to produce a required workout. The stage loading is limited by the fact that high-stage loading impacts efficiency. The stage loading parameter can be characterized on the basis of a minimum relative Cm/U (flow coefficient). The flow coefficient is the ratio of the axial velocity entering to the meaning rotor speed. It has been found that compressors and turbines work most satisfactorily if the non-dimensional axial velocity, often called flow coefficient is in a restricted range. The flow coefficient for a given stage is a characteristic of the mass flow behavior through the stage. For a given flow coefficient, the stage loading increases with an increase in blade angle of the compressor blades from the axial direction.

The control of the compressor parameters enables the plant operator to run the gas turbine at lower loads in varying ambient conditions, such as cold temperatures, while avoiding the aeromechanical stresses that conventional gas turbines are subjected to at the lower temperatures. This is accomplished by controlling the inlet temperature of the air entering the compressor and the vane angle of the vanes in the IGV subsystem 19. The compressor inlet temperature is controlled using extracted exhaust gas. By controlling the temperature of the blended gasses supplied through the IGV 19 to the compressor 13 the gas turbine 3 is able to operate above the turndown restricted zone in low ambient temperatures (beyond nominal Cm/U levels) thereby protecting the compressor 13 when the gas turbine 3 is operating at low loads. Additionally, the hibernation mode subsystem seven enables the operator of a gas turbine 3 to operate in turn downloads beyond nominal CO emission limits.

The customer benefits with extended turndown are increased annual production hours (availability, capacity factor) reduction in start-up shut-down cycles (reduced maintenance cost) and significant improvement in operating efficiency at this lower turndown relative to nominal under low ambient temperatures.

An advantage of the compressor protection subsystem 5 described herein is that capital and maintenance costs may be reduced by reducing the overall complexity of the system used to heat the air supplied to the compressor 13. Another advantage of the compressor protection subsystem 5 described herein is that it allows the operator of a gas turbine 3 to improve the operating efficiency when using low BTU fuel gases such as in an integrated gasification combined-cycle (IGCC) operation.

Figure 4:
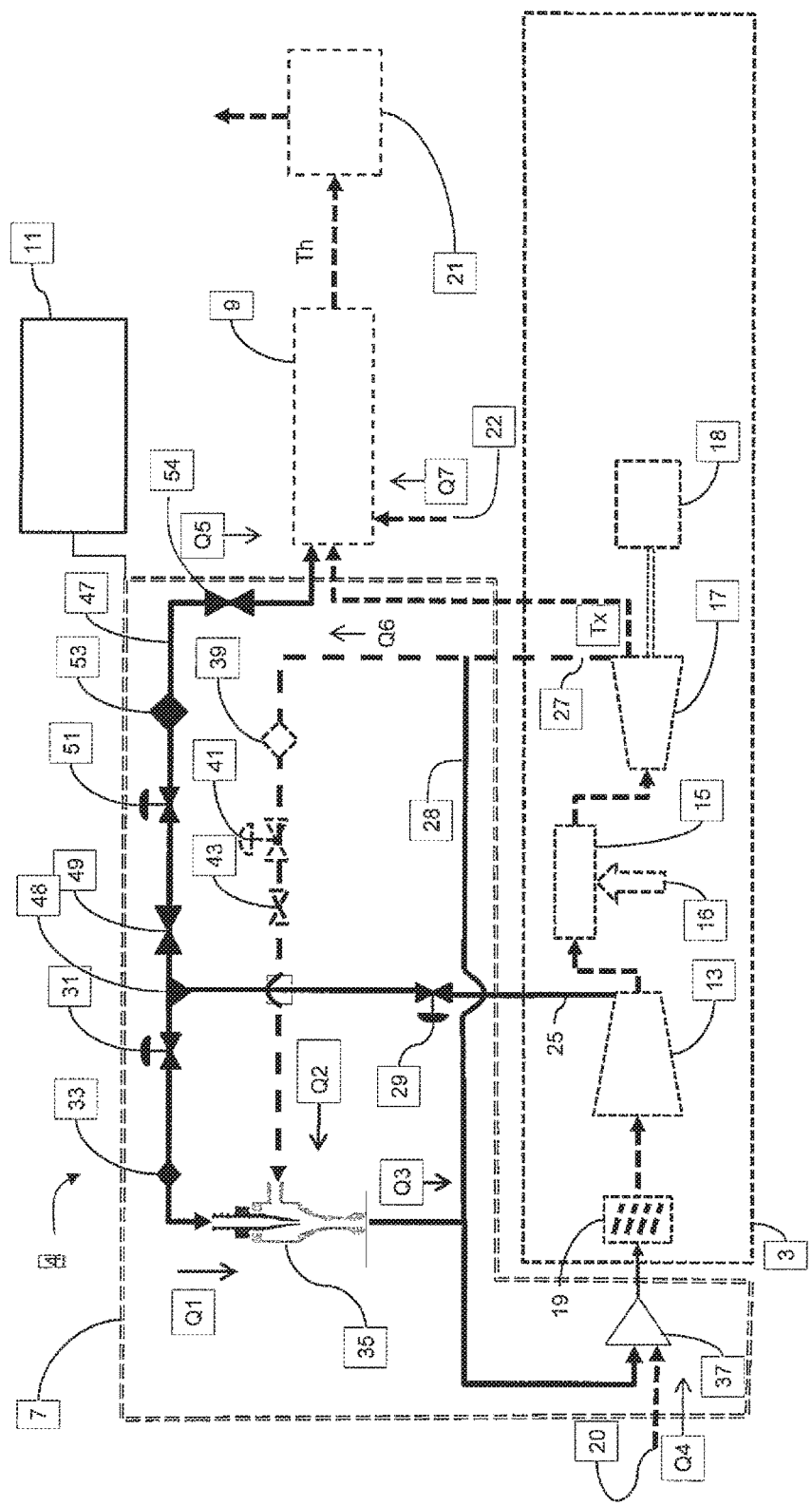
FIG. 4 is a block diagram illustrating a hibernation mode subsystem according to one embodiment of the present invention.

Illustrated in FIG. 4 is an embodiment of a hibernation mode subsystem 7. The hibernation mode subsystem 7 is illustrated within the double dashed outline, and the components of the hibernation mode subsystem 7 are illustrated as solid lines. Other components of the gas turbine system 1 are illustrated as dashed lines. In this embodiment, compressed air from the compressor 13 is split at splitter 48 into a portion to be bled into the compressor 13 through an upstream compressor bleed control valve 29, a downstream compressor bleed control valve 31, and a compressor bleed flow sensor 33. The portion to be bled into the compressor is conveyed to the IGV subsystem 19. The compressed air from the compressor 13 is also split into a second portion to be overboarded to the exhaust gasses through a compressor air overboarding line 47. The flow of the air to be overboarded to the exhaust gases is controlled by an over boarding block valve 49, and over boarding control valve 51 and an overboarding flow sensor 53. The overboarding flow sensor 53 provides flow rate data to the control subsystem 11. The control subsystem 11 combustor provides control signals to the over boarding block valve 49 and the over boarding control valve 51.

The hibernation mode subsystem 7 enables a hibernation mode by overboarding compressor discharge air to the compressor inlet and to the turbine exhaust, thereby maintaining the desired fuel air ratio (FAR) that supports emissions at a level below the maximum limits. The hibernation mode subsystem 7 may be integrated with the previously described compressor protection subsystem 5. This invention also reduces the customer's operation and maintenance costs associated with operation at very low hours/starts ratio.

The hibernation mode subsystem 7 enables the operator of the gas turbine 3 to operate at an extreme low "hibernation mode" level of approximately 10% load with the capability to rapidly ramp load up to base load level to provide for needed spinning capacity. The hibernation mode subsystem 7 may also reduce the operation and maintenance costs associated with the operation of a gas turbine 3 at very low hours/starts ratio. The hibernation mode subsystem 7 also enables the operator of the gas turbine 3 to operate at an extreme low hibernation mode while still complying with emissions regulations. The hibernation mode subsystem 7 illustrated in this embodiment would require no design changes to the gas turbine 3 centerline or combustion systems and may be accomplished with minimal additional capital components. The hibernation mode subsystem 7 enables selectable gas turbine 3 turndown beyond nominal CO & NOx emissions limits. Additionally, the hibernation mode subsystem 7 establishes a scheme to trim air-fuel ratio and mitigate combustor lean-blow-out.

Figure 5:
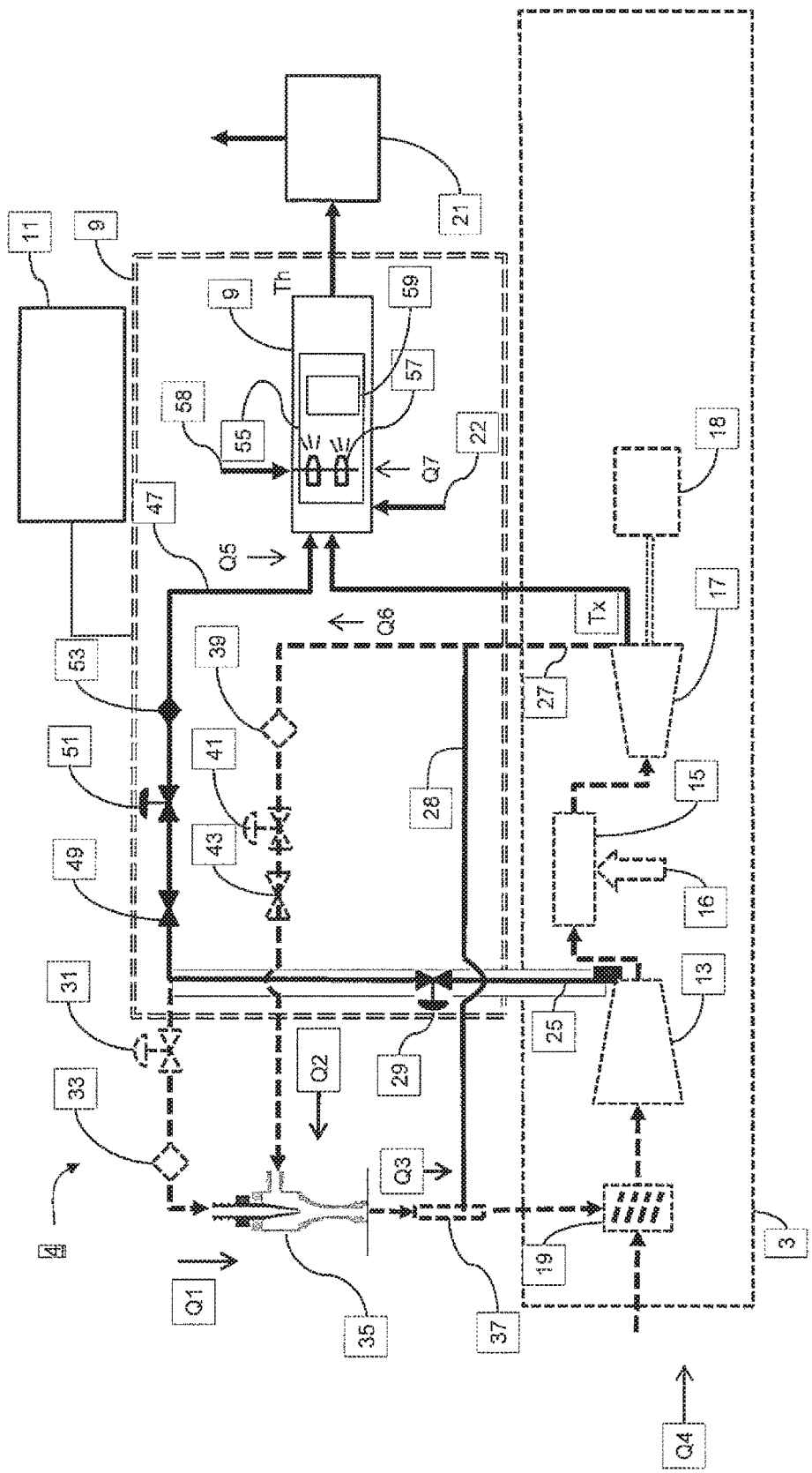
FIG. 5 is a block diagram illustrating a combined cycle isotherm subsystem according to one embodiment of the present invention.

Illustrated in FIG. 5 is a combined cycle isotherm subsystem 9 which may be implemented as part of the turndown subsystem 4 in a combined cycle embodiment. In a combined cycle embodiment, high temperature exhaust gas from a gas turbine 3 is passed through a heat recovery steam generator 21 to produce steam that drives a steam turbine. It is often desirable to uprate the gas turbine 3 to increase output and reduce heat rate, however, the design limits of the heat recovery steam generator 21 can impose additional constraints on the optimal gas turbine operation at base-load, part-load and load-ramp operating modes.

The combined cycle isotherm subsystem 9 is illustrated within the double dashed outline, and the components of the combined cycle isotherm subsystem 9 are illustrated as solid lines. Other components of the gas turbine system 1 are illustrated as dashed lines. In this embodiment, compressed air from the compressor 13 flows through compressor bleed line 25. As previously described, an upstream compressor bleed control valve 29 may be disposed on the compressor bleed line 25. Additionally, over boarding block valve 49, over boarding control valve 51, and over boarding flow sensor 53 may be disposed on the compressor air over boarding line 47. Additionally, Safety valve 54 may be disposed on the compressor air overboarding line 47. The compressed air may be blended with the exhaust from the turbine 17 and with attemperation fluid at combined cycle input 22. The combined compressor air, exhaust and attemperation fluid may flows through an attemperation subsystem 55, where the temperature of the combined gases may be controlled. The combined attemperated gases are made to flow into a heat recovery steam generator subsystem 21, where additional work may be extracted.

Combined cycle operation requires that the exhaust gases leaving the gas turbine engine be within a specific temperature range. That is the exhaust temperature cannot be too high to avoid degrading the gas turbine exhaust duct and heat recovery steam generator 21 hardware. Further, the temperature should not fall below a certain temperature value to avoid a condition called forced cooling when thermal transients in steam turbine rotor and casing can degrade the turbine rotor. The two temperatures limits discussed above are referred to as the upper threshold isotherm and the lower threshold isotherm respectively.

The attemperation subsystem 55 is an assembly that provides after-cooling with water foggers for attemperation. The attemperation subsystem 55 provides an optimized fogger arrangement in the exhaust duct of the gas turbine 3, with one or more fogger injection nozzles 57 located in the a duct. Each fogger injection nozzle 57 is provided with condensate or other working fluid from working fluid input 58 and is shielded upstream by a shaped baffle assembly 59.

Illustrated in FIGS. 6 and 7 is the shaped baffle assembly 59. Baffles 61 are strategically placed to optimize the overlapping spray pattern 62 to achieve gas temperature uniformity. The attemperation subsystem 55 accepts condensate from any pressure zone in the heat recovery steam generator subsystem 21 or externally supplied demineralized water as the working fluid. The fogger flow rate and the condensate source may be controlled by the control subsystem 10.

The combined cycle isotherm subsystem 9 provides the capability to externally manage and optimize the exhaust gas temperature entering the heat recovery steam generator 21 by means of aftercooling with attemperating water foggers.

The combined cycle isotherm subsystem 9 partially overcomes some of the constraints to efficiency and ability to operate at part load that is imposed by inlet gas temperature limits. These constraints can limit the output of the gas turbine 3 and overall plant efficiency at all load points. Consequently, the gas turbine 3 may be operated with exhaust gas temperature above the inlet temperature limit of the HRSG 21 during all operating modes, improving the load ramp rates and exhaust gas heat transfer to the heat recovery steam generator subsystem 21. The combined cycle isotherm subsystem 9 provides a method to externally manage and optimize the temperature of the exhaust gas from the gas turbine 3 entering the heat recovery steam generator subsystem 21 by means of after-cooling with water/steam foggers for attemperation. Additionally, the combined cycle isotherm subsystem 9 provides a fogger nozzle and baffle arrangement for downstream temperature uniformity and enables gas turbine customer to operate the gas turbine 3 with exhaust gas temperature above the inlet temperature limit of the heat recovery steam generator subsystem 21 during any operating mode. Use of the combined cycle isotherm subsystem 9 also improves the combined cycle gas turbine plant load ramp rate and prevents a mismatch between the gas turbine 3 and the heat recovery steam generator subsystem 21 when a gas turbine 3 is uprated. Another advantage of the combined cycle isotherm subsystem 9 is that it provides a means for adjusting load balance between gas turbine 3 and the combined cycle plant, with maximum steam production when power output is not required. This in turn provides the power plant operator with flexibility in some applications where additional steam is desired such as with district heating and on site cogeneration in facilities such as refineries. Other advantages are improvement of the exhaust gas heat transfer to the heat recovery steam generator subsystem 21 and the combined cycle gas turbine heat rate under part-load conditions where the gas turbine 3 is isotherm constrained. Finally, the combined cycle isotherm subsystem 9 improves emissions profile under extended turndown and the ability to uprate vintage power plants. Additional benefits include increased annual production hours (availability, capacity factor); Reduction in combined cycle gas turbine start-up shut-down cycles (reduced maintenance cost) with load balancing flexibility and improvement in part-load operating efficiency with combined cycle gas turbine uprates.

Figure 8:
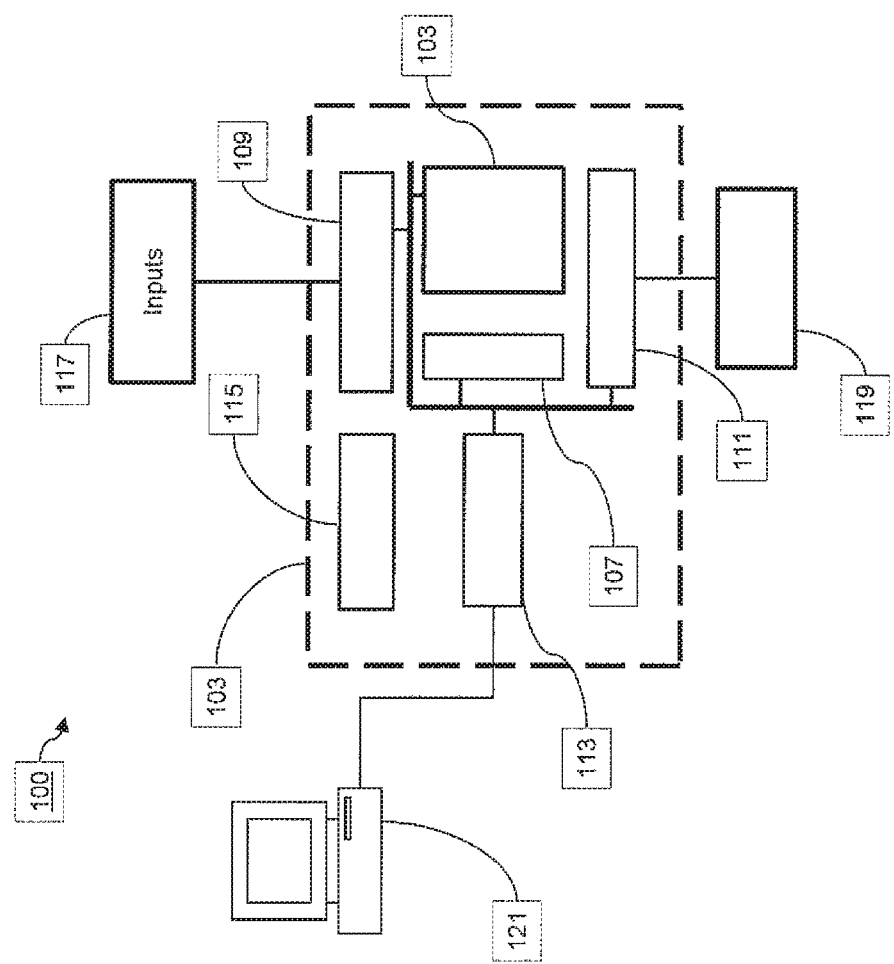
FIG. 8 is a block diagram illustrating a control subsystem according to one embodiment of the present invention.

Illustrated in FIG. 8 is a control subsystem 100 used to control the various components and processes of the turbine system 1. The control subsystem 100 may include a control module 103, typically a digital computer that automates electromechanical processes such as control of components of the turbine system 10. These components may include the inlet guide vane subsystem 19, the compressor 13, and the combustor 15. For example, the control module 103 may be a General Electric SPEEDTRONIC™ Gas Turbine Control subsystem, such as is described in Rowen, W. I., "SPEEDTRONIC™ Mark V Gas Turbine Control subsystem", GE-3658D, published by GE Industrial & Power Systems of Schenectady, N.Y. For example, a control subsystem such as described in U.S. Pat. No. 6,912,856 entitled "Method and System for Controlling Gas Turbine by Adjusting Target Exhaust Temperature," by Rex Allen Morgan, et al, which is hereby incorporated by reference.

The control module 103 includes a central processing unit 105. Associated with the central processing unit 105 may be a memory component 107 an input component 109 and output component 111. The memory component 107 may include a flash disk card, a random access memory card (RAM), a read only memory (ROM), a dynamic random access memory (DRAM); asynchronous dynamic random access memory (SDRAM), or any other desired type of memory device and may be part of or separate from the control module 103. The input component 109 and the output component 111 may be combined as a single input output card associated with the control module 13. Although the input component 109 of the output component 111 are illustrated as being built into the control module 103, they may be provided as external input output modules attached to a computer network that plugs into the control module 103.

Additionally control module 103 includes a communication component 113 and a power supply 115. The control module 103 processes multiple inputs 117 and provides multiple outputs 119. The control module 103 may also be coupled to a human machine interface (HMI) 121, such as a digital computer. The HMI, also referred to as man-machine interfaces (MMIs) and graphical user interface (GUIs) may include use buttons and lights to interact with the user, text displays, and graphical touch screens. Programming and monitoring software may be installed in a computer connected to the control module 103 via a communication interface. Programs implementing algorithms to control the various processes would typically be stored in the memory component 107.

Databases may be stored in memory component 107. The databases stored in memory component 107 may include a compressor loading limit database that associates with each gas turbine 3 the compressor loading limits for different temperatures Ti at the compressor inlet, fuel air ratio (FAR) at the combustor and guide vane angle $\theta$.

The databases stored in memory component 107 may include emissions limit database that associates emission limits for different Ti, $\theta$, and FAR for each gas turbine 3. The databases stored in memory component 107 may include a flow rate database that associates with each gas turbine 3 the various flow rates (Q1, Q2, Q3 etc) for different Ta, Ti, FAR, and $\theta$. Other information in the databases may include compressor flow vs. emission schedules, compressor emission models, data indicating the flow rate coefficient at which aeromechanical stresses occur at the latter stages of the compressor for the specific gas turbine 3 at different ambient temperatures and varying IGV angles.

Figure 9:
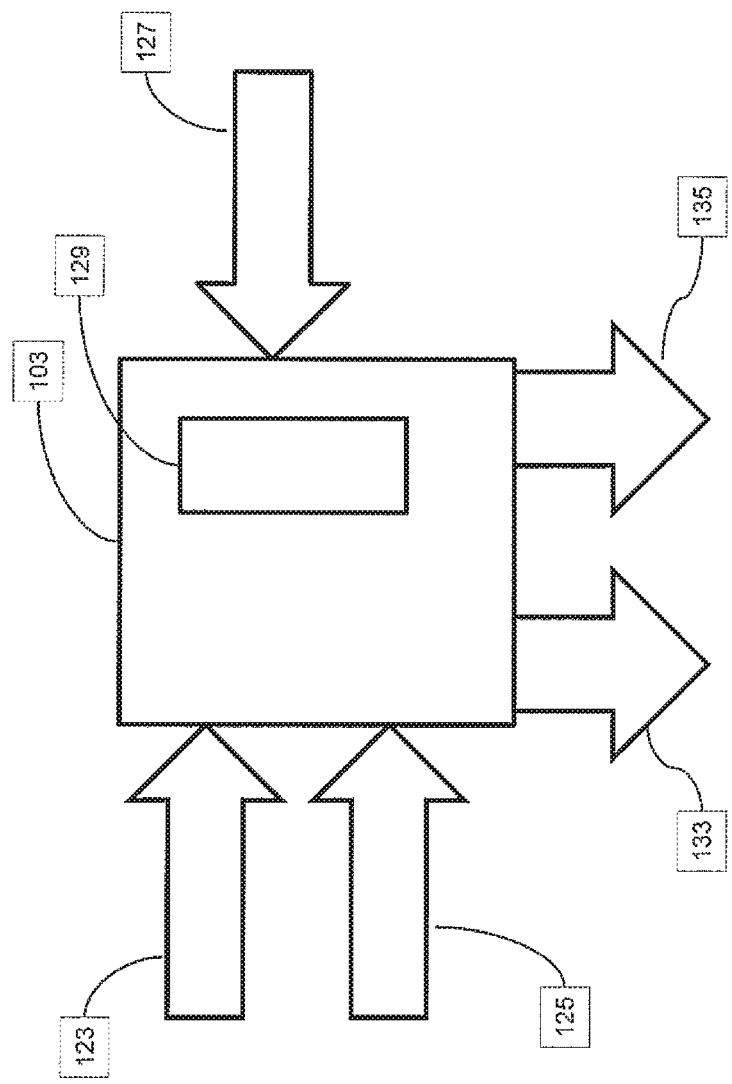
FIG. 9 is a block diagram of inputs and outputs of a control subsystem according to one embodiment of the present invention.

With reference to FIG. 9, the control module 103 may receive various inputs from the turbine system including inputs relevant to the control of the turbine (turbine inputs) 123, and inputs to relevant to the control of the control of the rest of the system (system inputs) 125. Additionally, the control module 103 may receive inputs from the HMI 121 (HMI inputs 127). The control module 103 will execute programs based on program logic 129 and provide outputs to control the turbine (turbine outputs 133) and outputs to control the rest of the system (system outputs 135).

Turbine Inputs 123 may include: turbine inlet temperatures; turbine exhaust temperature; and unit specific inlet temperature schedules. System inputs 125 may include: extended turndown unit specific compressor inlet temperature schedules; extraction flow rates; extraction temperatures; inlet temperature schedules; control valve positions; Safety/Block valve positions, among others. HMI inputs 127 may include: selection of a "Normal" Mode—(Outputs-Control valves closed, Safety valves closed); or "Turndown" Mode—(Outputs-Control valves open permissive, Block valves open permissive).

On a high level, the program logic 129 may be represented as follows:

| HMI Setting | Exhaust gas extraction block valve 43 positions | Downstream compressor bleed control valve 31 position |
|---|---|---|
| Normal | Closed | Closed |
| Turndown | Permitted to ramp open | permitted to ramp open |

System outputs 135 may include instructions to open and close the exhaust gas extraction block valve 43, the overboarding block valve 49, and the safety block valve 54. Additionally system outputs 135 may include instructions to set the positions of Upstream Compressor bleed control valve 29, Downstream compressor bleed control valve 31, Exhaust gas extraction (EGE) control valve 41 and overboarding control valve 51.

Figure 10:
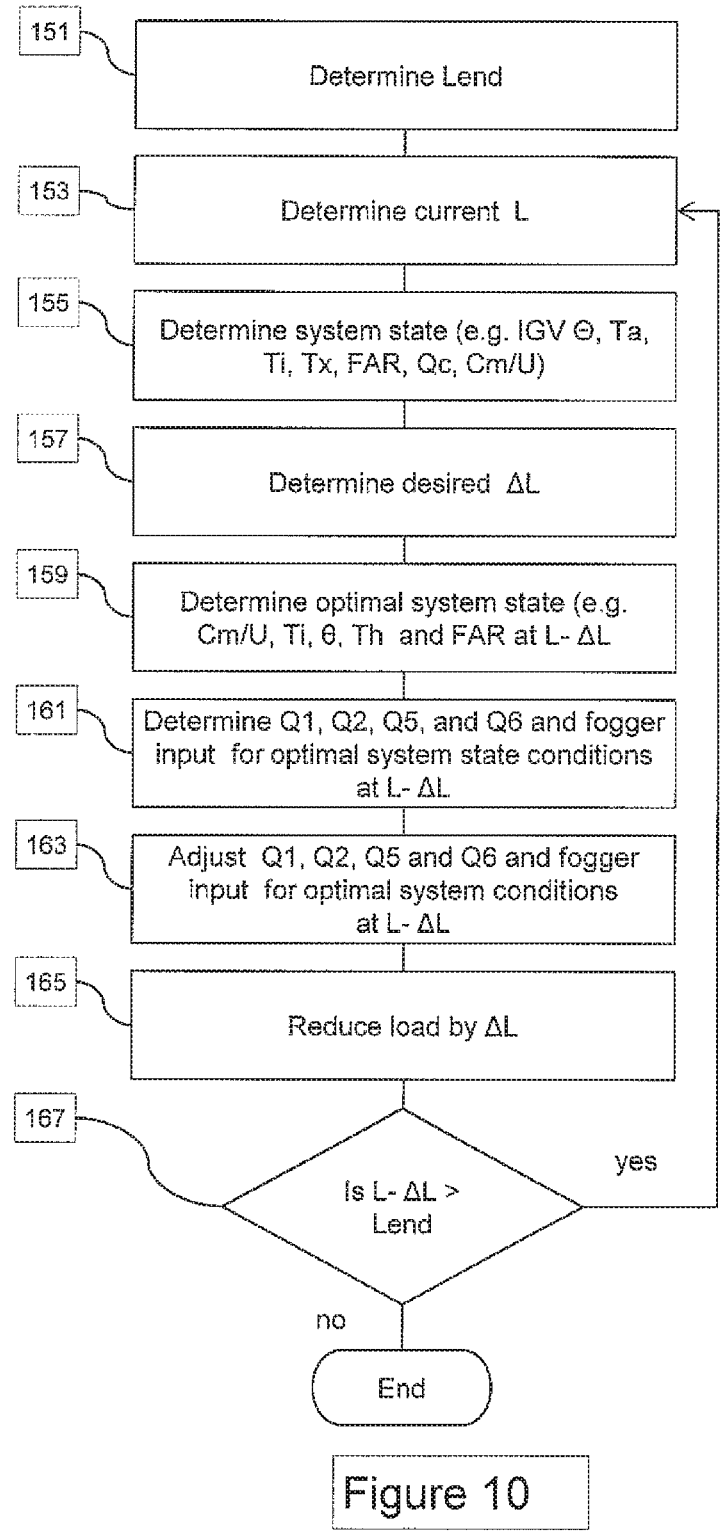
FIG. 10 is a flow diagram of a method for turning down the power output in a gas turbine system according to one embodiment of the present invention.

FIG. 10 is a flow chart of an illustrative method that may be carried out by the compressor protection subsystem 5 to reduce the load on a gas turbine 3 from a starting load (Lstart) to a turndown level load (Lend). The operator determines the existing load Lstart (method element 151) and a desired load Lend (method element 153). The control subsystem 11 receives data from sensors including ambient temperature (Ta), the temperature at the compressor inlet (Ti), the IGV vane angle (θ), compressor bleed flow rate Q1, and exhaust gas extraction flow rate Q2 (method element 155). The operator may determine a rate of load decrease ΔL/t to take the load from Lstart to L end. An incremental decrease of the load ΔL (method element 157) may be determined and the optimal Cm/U, Ti, and θ may be calculated or determined based on the Cm/U restrictions and emission limits for the particular gas turbine (method element 159). Based on those values, the control subsystem may determine the necessary flows Q1, Q2, Q5 and Q6 to achieve those conditions, as well as the input parameters for the attemperation subsystem 55 (method element 161). The control subsystem 11 provides instructions to the EGE control valve 41 and downstream compressor bleed control valve 31 to achieve the desired conditions for the reduced load (method element 163). The load is then reduced by ΔL (method element 165). If Lend has not been reached, then the process is repeated until the load reaches Lend (method element 167).

Figure 11:
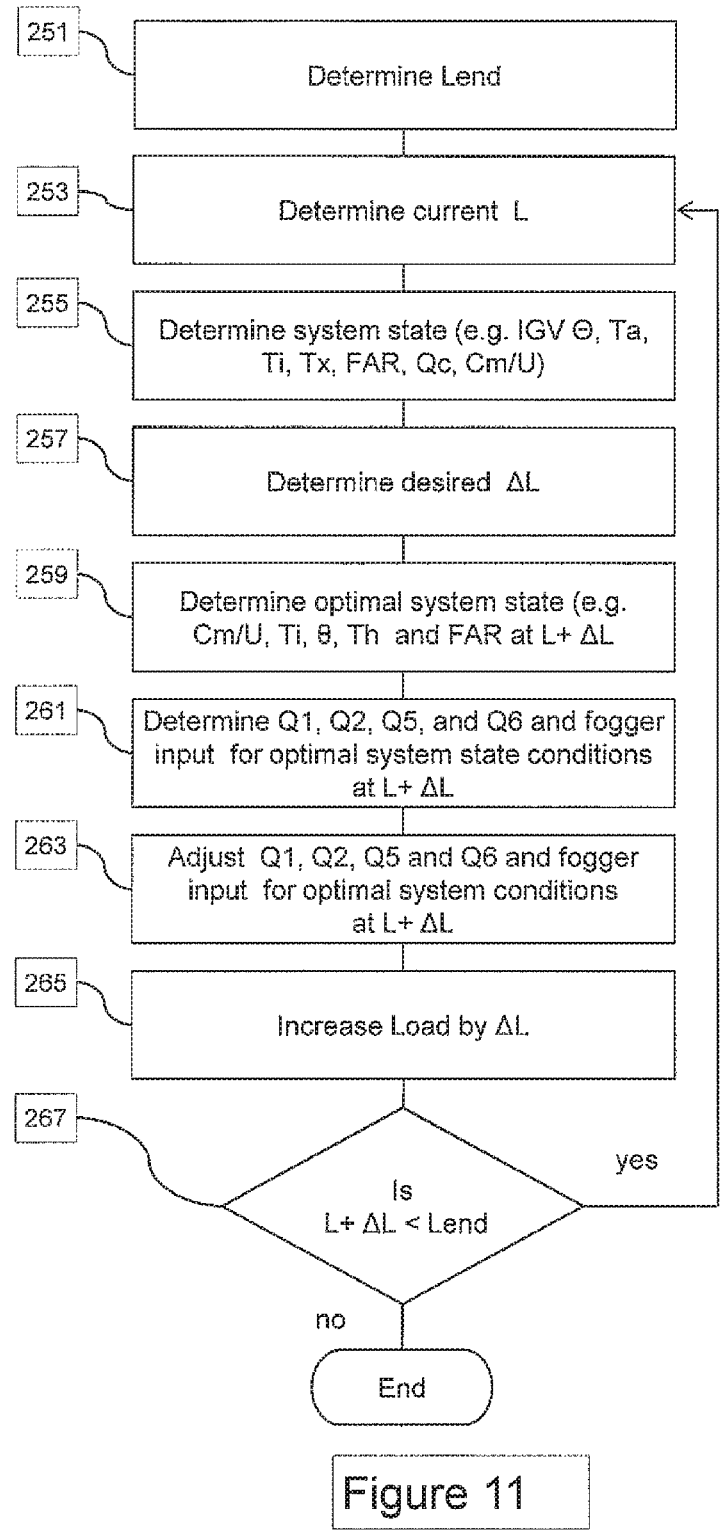
FIG. 11 is a flow diagram of a method for turning down the power output in a gas turbine system according to one embodiment of the present invention.

FIG. 11 is a flow chart of an illustrative method that may be carried out by the compressor protection subsystem 5 to increase the load on a gas turbine 3 (ramp-up) from a starting load (Lstart) to a ramp up level load (Lend). The operator determines the existing load Lstart (method element 251) and a desired load Lend (method element 253). The control subsystem 11 receives data from sensors including ambient temperature (Ta), the temperature at the compressor inlet (Ti), the IGV vane angle (0), compressor bleed flow rate Q1, and exhaust gas extraction flow rate Q2 (method element 255). The operator may determine a rate of load increase ΔL/t to take the load from Lstart to L end. An incremental increase of the load ΔL (method element 257) may be determined and the optimal Cm/U, Ti, and θ may be calculated or determined based on the Cm/U restrictions and emission limits for the particular gas turbine (method element 259). Based on those values, the control subsystem may determine the necessary flows Q1, Q2, Q5 and Q6 to achieve those conditions, as well as the input parameters for the attemperation subsystem 55 (method element 263). The control subsystem 11 provides instructions to the EGE control valve 41 and downstream compressor bleed control valve 31 to achieve the desired conditions for the increased load (method element 265). If Lend has not been reached, then the process is repeated until the load reaches Lend.

Utilizing the methods illustrated in FIGS. 10 and 11 provide an operator with the flexibility to control not only the start and end load, but also the rate at which the load is changed, while avoiding the aeromechanical stresses on the compressor 13.

FIG. 12 illustrates an embodiment of a method for turning down a gas turbine 3 to a turndown load while still complying with emissions standards that may be performed by the hibernation mode subsystem 7 The operator determines the current load (L) (method element 271) and the desired end load (Lend) (method element 273. The operator can then determine an incremental change in the load ΔL (method element 275). The control subsystem 11 may determine if the flow coefficient at the new load level ($Cm/U_{L+\Delta L}$) would be lower than the flow coefficient at the restricted range ($Cm/U_R$) (method element 277). If the flow coefficient at the new load level would be less than the restricted range flow coefficient, then the control subsystem 11 calculates a change in the compressor inlet temperature ΔT and any change in the IGV vane angle θ that would be required to maintain the flow coefficient at a level higher than the restricted range flow coefficient (method element 279). The control subsystem 11 then determines whether the NOx at the new load level would be greater than the applicable maximum NOx emission permissible. Additionally, the control subsystem 11 may also determine if the CO emissions at the new load level would be greater than the applicable maximum CO emissions permissible. (Method element 281). If the emission levels calculated for the new load exceeds the permissible levels the control subsystem would then calculate a change in the fuel air ratio necessary for the combustor to operate at emissions levels within the permissible levels (method element 283). The control subsystem 11 may then change the load to a new level (method element 285). The control subsystem 11 may determine if the flow coefficient at the new load level is less than the flow coefficient at the restricted level (method element 287). If the flow coefficient at the new load level is less than the flow coefficient at the restricted level, the control subsystem 11 would instruct the hibernation mode subsystem 7 to adjust the inlet temperature accordingly (method element 289). The control subsystem 11 may determine if the NOx emissions level exceeds the NOx emissions limit imposed on the system. The control subsystem 11 may also determine if the CO emissions level exceeds the CO emissions limit imposed on the system (method element 291). If the emissions at the new load level exceed the applicable emissions level control subsystem 11 would instruct the hibernation mode subsystem 7 to adjust the fuel to air ratio at the combustor 15 so that the emissions are within the permissible level (method element 293). In a combined cycle gas turbine system the method may additionally include a method element for determining the inlet temperature to the heat recovery steam generator subsystem 21 for the new load, and if it exceeds a permissible temperature limit, the control subsystem 11 may instruct the combined cycle isotherm subsystem 9 to attemperate the temperature of the gas is entering the heat recovery steam generator subsystem 21 so that the temperature falls within acceptable limits. Utilizing the method illustrated in FIG. 12 provides an operator with the flexibility to control not only the start and end load, but also the rate at which the load is changed, while avoiding violation of limits imposed by emissions standards.

The combination of the compressor protection subsystem 5, the hibernation mode subsystem 7, and in the case of a combined cycle gas turbine system, the combined cycle isotherm subsystem 9, provide a plan operator with the flexibility to operate a gas turbine at very low load levels with higher efficiency than conventional systems. Additionally, the combination of subsystems provides the operator with multiple paths to changing the power output of the gas turbine system 1. By controlling the combination of the compressor inlet temperature, the fuel to air ratio at the combustor 15, and the temperature of gases at the inlet of the heat recovery steam generator subsystem 21, the operator is able to improve the efficiency of a gas turbine 3 and/or the combined cycle at a given partial load and for a given ambient temperature.

The various embodiments of the gas turbine system 1 provide significant operating advantages to a gas turbine 3. For example, calculations for a representative gas turbine 3 indicate that the turndown limits may be decreased from a range of between approximately 45% to 60% load to a range of between approximately 10% to 36%, while still maintaining NOx and CO compliance. These load levels may be maintained with a measurable impact on the BTU/KWh required to operate at the particular load level.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A gas turbine system comprising:
   a compressor;
   a combustor;
   a turbine;
   a compressor protection subsystem;
   wherein the compressor protection subsystem comprises a compressor bleed line, an exhaust gas extraction line, and a blending assembly coupled to the compressor bleed line and the exhaust gas extraction line;
   a hibernation mode subsystem;
   wherein the hibernation mode subsystem comprises a compressor air overboarding line in communication with the compressor bleed line; and
   a control subsystem that controls the compressor protection subsystem and the hibernation mode subsystem.

2. The gas turbine system of claim 1 further comprising:
   a bleed control valve disposed on the compressor bleed line; and
   a recirculation control valve disposed on the exhaust gas extraction line.

3. The gas turbine system of claim 1 further comprising:
   a bleed flow sensor disposed on the compressor bleed line;
   a recirculation flow sensor disposed on the exhaust gas extraction line.

4. The gas turbine system of claim 1 wherein the blending assembly comprises an eductor.

5. The gas turbine system of claim 1 further comprising:
   an attemperation subsystem coupled to the combustor; and
   a heat recovery steam generator subsystem coupled to the attemperation subsystem.

6. The gas turbine system of claim 5 wherein the attemperation subsystem comprises:
   a working fluid source;
   a shaped baffle assembly; and
   a plurality of fogger injection nozzles coupled to the working fluid source and disposed in the shaped baffle assembly.

7. The gas turbine system of claim 6 wherein the shaped baffle assembly comprises a plurality of baffles disposed downstream from the fogger injection nozzles.

8. The gas turbine system of claim 1 further comprising:
   a turndown subsystem;
   wherein the turndown subsystem comprises a heat recovery steam generator in communication with the compressor air overboarding line;
   a combined cycle isotherm subsystem comprising at least a fogger nozzle; and
   the control subsystem that provides instructions to the turndown subsystem to maintain in airflow through the compressor an inner flow coefficient for the partial load up of a minimum flow rate coefficient where aeromechanical stresses occur in the compressor.

9. The gas turbine system of claim 8 wherein the control subsystem provides instructions to the hibernation mode subsystem to maintain an air fuel ratio in the combustor so that exhaust gas emission components from the turbine are maintained below a predetermined component emission level.

10. The gas turbine system of claim 8 wherein the control subsystem provides instructions to the combined cycle isotherm subsystem to maintain an exhaust gas temperature at an inlet of the heat recovery steam generator below a predetermined maximum inlet temperature.

* * * * *